United States Patent
Kim et al.

(10) Patent No.: US 8,589,889 B2
(45) Date of Patent: Nov. 19, 2013

(54) APPARATUS AND METHOD OF DETECTING ERRORS IN EMBEDDED SOFTWARE

(75) Inventors: Han-cheol Kim, Yongin-si (KR);
Keun-soo Yim, Yongin-si (KR);
Seung-won Lee, Hwaseong-si (KR);
Jeong-joon Yoo, Yongin-si (KR);
Jae-don Lee, Paju-si (KR); Young-sam Shin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1216 days.

(21) Appl. No.: 11/984,105

(22) Filed: Nov. 13, 2007

(65) Prior Publication Data

US 2008/0282229 A1 Nov. 13, 2008

(30) Foreign Application Priority Data

Dec. 1, 2006 (KR) .................. 10-2006-0120954

(51) Int. Cl.
*G06F 9/45* (2006.01)
*G06F 11/00* (2006.01)

(52) U.S. Cl.
USPC ........... 717/127; 717/126; 717/128; 717/130; 717/148; 714/2; 714/5; 714/48

(58) Field of Classification Search
None
See application file for complete search history.

(56) References Cited

U.S. PATENT DOCUMENTS

| | | | | |
|---|---|---|---|---|
| 5,475,845 | A * | 12/1995 | Orton et al. | 719/328 |
| 6,785,843 | B1 * | 8/2004 | McRae et al. | 714/23 |
| 7,774,757 | B1 * | 8/2010 | Awasthi et al. | 717/127 |
| 7,949,904 | B2 * | 5/2011 | Ritz et al. | 714/48 |
| 2006/0085665 | A1 * | 4/2006 | Knight et al. | 714/2 |
| 2006/0259899 | A1 * | 11/2006 | Cooper et al. | 717/127 |
| 2007/0283327 | A1 * | 12/2007 | Mathew et al. | 717/124 |
| 2008/0005609 | A1 * | 1/2008 | Zimmer et al. | 714/5 |
| 2009/0144708 | A1 * | 6/2009 | Deedwaniya et al. | 717/140 |
| 2009/0193442 | A2 * | 7/2009 | Orton et al. | 719/328 |

FOREIGN PATENT DOCUMENTS

| | | |
|---|---|---|
| JP | 2003-91432 | 3/2003 |
| JP | 2004-272830 | 9/2004 |
| JP | 2005-284785 | 10/2005 |
| KR | 10-2004-0096238 | 11/2004 |
| KR | 10-2006-0030393 | 4/2006 |
| KR | 10-2006-0041561 | 5/2006 |

OTHER PUBLICATIONS

Anup Ghosh et al., "An Approach to Testing COTS software for Robustness to Operating System Exceptions and Errors", 1999, pp. 1-8.*

(Continued)

*Primary Examiner* — Isaac Tecklu
(74) *Attorney, Agent, or Firm* — Staas & Halsey LLP

(57) ABSTRACT

A method and apparatus for detecting errors in an application software of an embedded system are provided. The method of detecting errors in an application software includes determining a development language of the application software and an operating system on which the application software is executed; replacing an error detection syntax inserted in order to examine an error in a predetermined function of the application software, with an error detection syntax according to the result of the determination; and performing exception handling for an error occurring in the function according to the result of the replacement, and logging error information according to the exception handling. According to the method and apparatus, an error can be automatically detected and logged irrespective of a development language and an operating system.

3 Claims, 8 Drawing Sheets

(56) References Cited

OTHER PUBLICATIONS

Douglas C. Schmidt et al., "Systems Programming with C++ Wrappers Encapsulating Interprocess Communication Mechanisms with Object-Oriented Interfaces", Department of Information and Computer Science, 1992, pp. 1-6.*

U.S. Department of Transportation, "Study of Commercial Off-The-Shelf (COTS) Real-TimeOperating Systems (RTOS) inAviation Applications", 2002, pp. 1-28.*

Mark Feldman, "Enterprise Wrappers for Information Assurance", Proceedings of the DARPA Information Survivability Conference and Exposition, 2003.

* cited by examiner

APPARATUS AND METHOD OF DETECTING ERRORS IN EMBEDDED SOFTWARE

CROSS-REFERENCE TO RELATED APPLICATIONS

This application claims the benefit of Korean Patent Application No. 10-2006-0120954, filed on Dec. 1, 2006, in the Korean Intellectual Property Office, the disclosure of which is incorporated herein in its entirety by reference.

BACKGROUND

1. Field

One or more embodiments relate to an apparatus and a method of detecting an error, and more particularly, to a method and apparatus for detecting an application error of an embedded system.

2. Description of the Related Art

An embedded system is an apparatus which has an embedded microprocessor or microcontroller and performs only functions that are specified by an original designer. Generally, the embedded system is a specific application system which, as part of a system larger than the embedded system, includes hardware and software in order to perform special tasks.

Embedded systems are applied to a variety of application fields, for example, a control field, including factory automation, home automation, robot control, and process control; a terminal device field, including mobile phones, personal digital assistants (PDAs), smart phones, and LBS (Location Based Services); an information appliance field, including printers, Internet refrigerators, video game consoles, and HDTVs; and a network device field, including exchanges, routers, home servers, and home gateways, Meanwhile, as embedded systems are applied to an increasing variety application fields and the number of digital applications increases, the functions of embedded systems have become more complicated, and in line with the increase in the variety of hardware systems, embedded software has been developed with a variety of development languages on a variety of operating systems. Accordingly, the number of software bugs has also been increasing.

In this changing environment, when a plurality of programs are tested or debugged in an embedded terminal to find errors or bugs, it takes much time to find errors that are purely related to the application, because of errors caused by the application's dependency on a hardware system or an operating system occur. Also, in the case of a poor embedded development environment that does not support exception handling in an operating system, it is difficult to detect an exception of an application.

FIG. 1 is a block diagram illustrating comparison of technical constructions with respect to an error detection function when an application is developed with different development languages on a variety of embedded operating systems according to conventional technology. According to the conventional technology, in the case of an operating system 1510 supporting a memory protection unit (MPU), errors are detected by using functions or macros that have similar functions but different names, such as "_try", and "_except( )" in development language 1 1101, "try", and "catch( )" in development language 2 1102, and "Try", and "Catch" in development language 3 1103. In a development language such as the C language, which does not have an error detection function, a critical error cannot be automatically detected, or only some exceptional errors can be identified through a variety of application program interfaces (APIs) supported by an operating system.

Also, in the case of most small-sized operating systems 1520 that do not support an MPU, even though the development languages 1 through 3 1101 through 1103 support exception handling functions, an operating system 1521 that does not support the functions cannot detect critical errors. However, in an operating system 1522 that does support the error detection functions through some hardware exception handling functions, the error detection function 1404 supported by the operating system can be used irrespective of the development language k 1104.

However, the conventional technology has many problems, which will be described below. Firstly, when an application is developed on an operating system, if a hardware problem occurs the hardware problem should be fixed and then the application can be verified, or if a complicated error occurs due to a combination of the application and the operating system, it takes much time to find a bug purely in the application and to stabilize the application. Secondly, in an environment of a poor operating system or a development language that does not support exception handling, it is impossible to automatically detect an error in an application, and thus it is difficult to debug the application. Thirdly, because an exception handling API is supported in different ways or not supported depending on the development environment, in the case of software meant to be reused in a variety of operating system such as middleware, it is difficult to reuse the software while performing exception handling. Fourthly, when coding is performed by using only an exception handling API provided by the conventional technology, the number of source lines increases in order to process debugging and logging with reducing intervals in which exceptions occur, and thus code readability is lowered and the source becomes complicated.

SUMMARY

Additional aspects and/or advantages will be set forth in part in the description which follows and, in part, will be apparent from the description, or may be learned by practice of the invention.

One aspect of the embodiments provides a system for verifying embedded software in a desktop environment irrespective of hardware and operating systems.

Another aspect of the embodiments also provides a method and apparatus for detecting an error, with a function for automatically detecting and logging an error irrespective of development languages and operating systems.

One aspect of the embodiments also provides a method of reusing an application and an error checking code developed in a desktop in an embedded system, by providing an error verification system and an error detector independently of development languages and operating systems.

According to an aspect of the embodiments, there is provided a desktop error verification system for verifying an error in an application of an embedded system, the system including: application programming interface (API) wrappers corresponding to an API supported by a plurality of operating systems (OSs) of the embedded system, each of the API wrappers corresponding to one of the plurality of the OSs, wherein the API wrapper is replaced by an API corresponding to the function of the API of the embedded system and supported by a desktop OS, and the API wrapper calls the replaced API, thereby verifying an error in the application.

According to another aspect of the embodiments, there is provided a method of detecting errors in an application including: determining a development language of the application and an operating system on which the application is executed; replacing a predetermined error detection syntax inserted in order to examine an error in a predetermined function of the application, with an error detection syntax according to the result of the determination; and performing exception handling for an error occurring in the function according to the result of the replacement, and logging the error information according to the exception handling.

According to another aspect of the embodiments, there is provided a method of detecting an error in an application including: inserting ERR_DETECT_TRY and ERR_DE-TECT_CATCH at the start and end, respectively, of a function for examining an error in the application, and coding the function; determining the Try type at ERR_DETECT_TRY and an OS on which the application is executed, and replacing ERR_DETECT_TRY with a Try syntax according to the result of the determination; if an error occurs in the function, determining the Catch type at ERR_DETECT_CATCH and an OS on which the application is executed, and replacing ERR_DETECT_CATCH with a Catch syntax according to the result of the determination; and searching for an exception handling code for the error, performing the exception handling according to a found exception handling code, and logging the error information according to the exception handling.

According to another aspect of the embodiments, there is provided a method of detecting an error in an application which is developed on a desktop OS, after loading the application and an error detection syntax developed on the desktop OS, on an embedded system without modification, the method including: verifying an error on the desktop OS according to an error detection syntax included in a predetermined function of the application, by using an error verification system of the desktop OS including API wrappers corresponding to an API supported by a plurality of OSs of the embedded system, each of the API wrappers corresponding to one of the plurality of the OSs; loading the verified application on the embedded system; determining a development language of the application and an OS of the embedded system on which the application is executed; replacing the error detection syntax with an error detection syntax corresponding to the development language and the OS according to the result of the determination; and according to the result of the replacing, performing exception handling for an error occurring in the function, and logging the error information according to the exception handling.

According to another aspect of the embodiments, there is provided an apparatus for detecting errors in an application including: a determination unit determining a development language of the application and an operating system on which the application is executed; a replacement unit replacing a predetermined error detection syntax inserted in order to examine an error in a predetermined function of the application, with an error detection syntax according to the result of the determination; an exception handling unit performing exception handling for an error occurring in the function according to the result of the replacement; and an error logging unit logging the error information according to the exception handling.

According to still another aspect of the embodiments, there is provided a computer readable recording medium having embodied thereon a computer program for executing the methods. Details and improvement of the present invention will be disclosed in dependent claims.

BRIEF DESCRIPTION OF THE DRAWINGS

The above-described and/or other aspects and advantages will become apparent and more readily appreciated from the following description of the embodiments, taken in conjunction with the accompanying drawings of which.

DETAILED DESCRIPTION OF THE EMBODIMENTS

Figure 1:
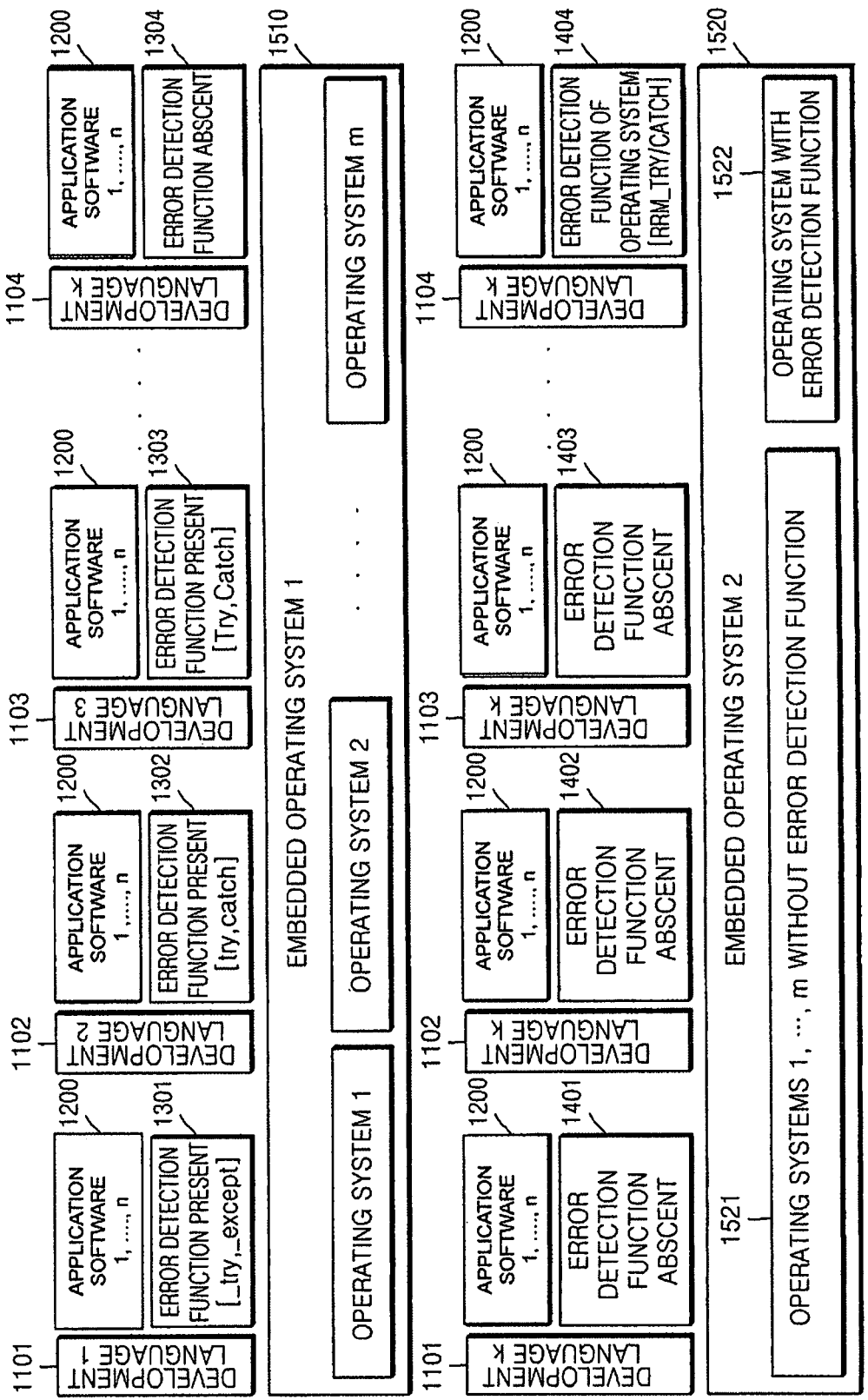
FIG. 1 is a block diagram illustrating an error detection function when an application is developed with different development languages on a variety of embedded operating systems according to conventional technology.

Reference will now be made in detail to the embodiments, examples of which are illustrated in the accompanying drawings, wherein like reference numerals refer to the like elements throughout. The embodiments are described below to explain the present invention by referring to the figures.

Figure 2:
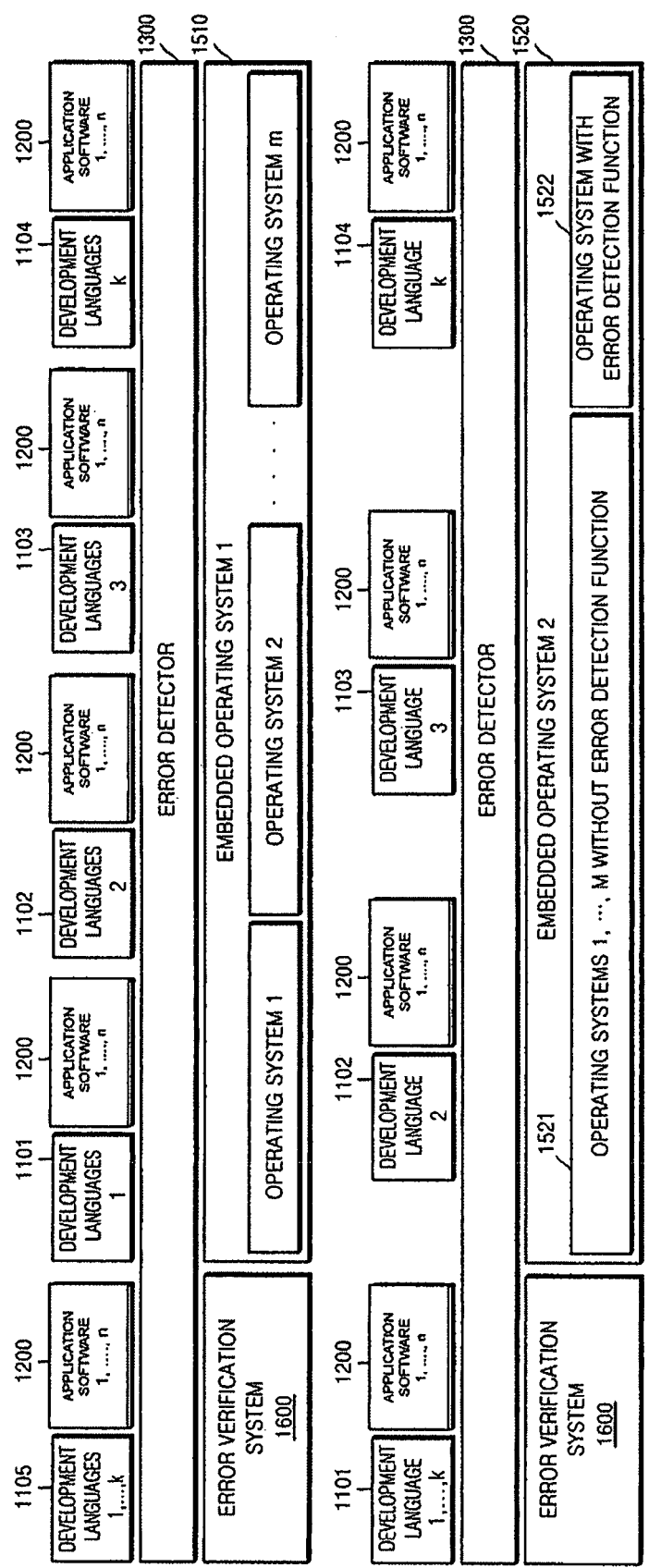
FIG. 2 is a block diagram illustrating an error verification system and an error detector independently of development languages and operating systems, according to an embodiment of the present invention.

FIG. 2 is a block diagram illustrating an error verification system and an error detector independently of development languages and operating systems (OSs), according to an embodiment.

Referring to FIG. 2, at the top of FIG. 2, development languages 1, . . . , k 1101 through 1105, an application 1, . . . , n 1200, an error detector 1300, an embedded OS 1 1510, and an error verification system 1600 are shown, while at the bottom of FIG. 2 an embedded OS 2 1520 including operating systems 1, . . . , m 1521 without an error detection function and an OS 1522 having an error detection function is shown.

The development languages 1, . . . , k 1101 through 1105 are programming languages for developing an application, and may be, for example, visual basic, C++, and Java. Each language declares or has an exception handling syntax, which is required for detecting and processing errors and bugs, and all the exception handling syntaxes are different from each other. There are also some languages that do not support exception handling.

In general, embedded operating systems can be broken down into hard real-time operating systems (RTOSs) and soft RTOSs in terms of restrictions in real-time processing, and can be broken down into thread-based RTOSs and process-based RTOSs in terms of the execution environment of an application software program.

In the thread-based OS, an OS kernel and an application program have the same execution environment, that is, the same address space, and, for example, VxWorks, pSOS, Nucleus Plus, and μC/OS are included. In the process-based OS, an OS kernel and an application software program follow a process performing model, and thus the application software is executed in an address space different from that of the kernel, and, for example, Windows CE, Windows NT Embedded 4.0, and Embedded Linux are included.

Each of these OSs supports only an application programming interface (APIs) that is suitable for the OS. For example, Windows CE is an OS newly designed for an embedded system, but supports most of Win32 APIs, and thus is classified as a Windows OS. However, Windows CE supports only APIs suitable for an embedded system among all Win32 APIs.

The embedded OS 1 1510 is an OS supporting an MPU, and the OS 2 1520 is a small-sized OS that does not support an MPU.

The error verification system 1600 is used to develop and test the application software 1200 on a desktop OS irrespective of the development language 1105 and the OSs 1510 and 1520, and automatically detects and verifies an error. In the conventional OSs 1510 and 1520, if exception handling is not supported or if an application is developed directly on an OS, stabilization of only the application takes much time. However, through the corresponding verification system 1600, an application is developed on a desktop OS, by commonly using an API supported by the embedded OSs 1510 and 1520, and when a test is performed, error verification effect can be achieved. Also, a time taken for downloading on a development board and executing a program source whenever the program source is changed, can be reduced. A detailed structure of the error verification system 1600 will be explained later with reference to FIG. 3.

The error detector 1300 can automatically detect an error of the application software 1200 even under an environment such as an OS 1521 that does not support an exception handling function, and even when the exception handling function is provided in a variety of AIP types in different OSs. Also, by using the error verification system 1600 of the desktop, the error detector 1300 enables the application software 1200 that is initially stabilized, to be commonly used in a variety of OSs 1510 and 1520 of the embedded system, without modifying the application software 1200. An error detection algorithm and detailed functions of the error detector 1300 will be explained later.

Figure 3:
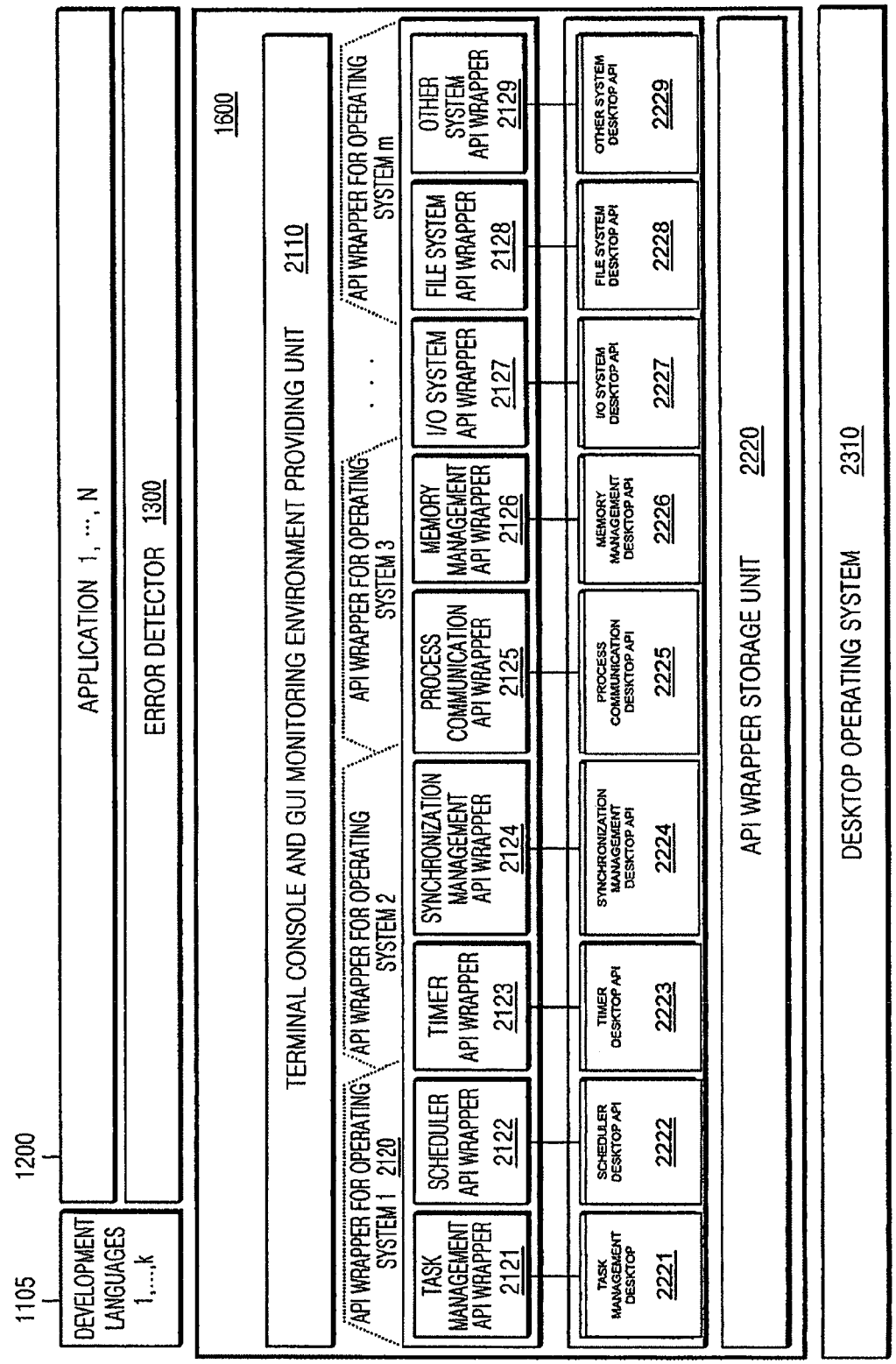
FIG. 3 is a block diagram illustrating a detailed structure of the error verification system illustrated in FIG. 2, according to an embodiment.

FIG. 3 illustrates a detailed structure of the error verification system 1600 illustrated in FIG. 2, according to an embodiment.

Referring to FIG. 3, while testing the application software 1200 which is developed by using a variety of development languages 1, . . . , k 1105 in the desktop OS 2310 irrespective of the development language 1105 and the OSs 1510 and 1520, the error verification system 1600 can automatically detect and verify an error.

FIG. 3 illustrates the error verification system 1600 providing this function, which includes a terminal console and GUI monitoring environment providing unit 2110, a plurality of API wrappers for OSs 2120, and an API wrapper storage unit 2220.

The error verification system 1600 operates on a desktop OS 2310 and provides an API wrapper of an embedded OS 2120. Thus, an application software is developed in the desktop. However, an environment providing the same functions as in the development of an application in the embedded OS is provided, and the advantage of abundant development tools and debugging environments can be used. An OS in an embedded system provides a variety of APIs. In order to use this API in a desktop OS without change and to develop an application, an API wrapper 2120 should be supported by each OS.

Here, the wrapper is data which presets a frame in front of actual data, or a program which sets another program so that the other program can be successfully executed. The wrapper also includes a program or script that sets a range of activities and enables execution of another program that is more important than the wrapper.

The API wrapper 2120 for each OS is illustrated in FIG. 3. The functions of the wrapper can be broadly broken down into 9 functions. A task management API which is supported by each OS is defined as a task management API wrapper 2121 and is also referred to as the task management API wrapper 2121, and this is replaced by a task management desktop API 2221 that is supported by the desktop OS 2310. Here, the task is a unit of jobs in an OS. Each task is assigned a priority level and has a set of CPU registers and its own stack area, and thus is capable of performing an independent program. Accordingly, in an OS, task management is performed, and an API performing this function is a task management API.

Due to this structure, although an application is developed on the desktop OS, the task function is performed internally in the embedded OS.

In this manner, a scheduler API wrapper 2122 of the OS 2120 is replaced by a scheduler Desktop API 2222, a timer API wrapper 2123 is replaced by a timer Desktop API 2223, a synchronization management API wrapper 2124 is replaced by a synchronization management Desktop API 2224, a process communication API wrapper 2125 is replaced by a process communication Desktop API 2225, a memory management API wrapper 2126 is replaced by a memory management Desktop API 2226, a device I/O system API wrapper 2127 is replaced by an I/O system Desktop API 2227, a file system API wrapper 2128 is replaced by a file system Desktop API 2228, and other API wrappers 2129 with a variety of functions that are supported in the embedded OS, are replaced by corresponding APIs for another desktop API 2229.

Here, the meaning of the replacement is as follows. For example, it is assumed that the name of an API for generating an execution module in the error verification system 1600 is CreateTask, and an OS A uses a function name NuCreateTask and an OS B uses a function name TaskCreate. Then, if the desktop OS is Windows XP but programming is performed assuming that the error verification system 1600 uses the OS A, and if an application developer uses the function name CreateTask, the OS A is called by NuCreateTask, that is, the function name suitable for the OS A, at the bottom of the wrapper. Then, when the application is ported from the OS A to the OS B, if only NuCreateTask at the bottom of the wrapper is automatically replaced without modifying the application so that the application can be called by the function name TaskCreate, the application can be quickly applied to a variety of OSs without restrictions.

More specifically, the desktop APIs 2221 through 2229 illustrated at the bottom in FIG. 3 are used in the same manner, and the API wrapper 2120 calls the desktop APIs 2221 through 2229 in each OS. Accordingly, an error verification test of an application software in the error verification system 1600 based on the desktop OS 2310 can be performed by the same code as is used for development of an application on the embedded OS 2120, without modifying the source code.

When the wrappers 2121 through 2129 are not prepared with respect to the commercial or non-commercial embedded OS 2120 at the source level, or when APIs are added to the existing embedded OS 2120, the API wrapper storage unit 2220 stores a table which allows mapping with the APIs 2221 through 2229 already supported by the desktop OS 2310, thereby providing an environment for execution on the embedded OS 2120 without modifying source codes one by one. In the API wrapper storage unit 2220, the sizes of a stack and a memory used in an embedded environment can be set to limit the environment. Accordingly, even when the application 1200 is developed in a desktop environment, a limited embedded environment is provided.

The terminal console and GUI monitoring environment providing unit 2110 provides the same environment as the screen output and terminal control in an embedded environment, to a desktop OS.

Figure 4:
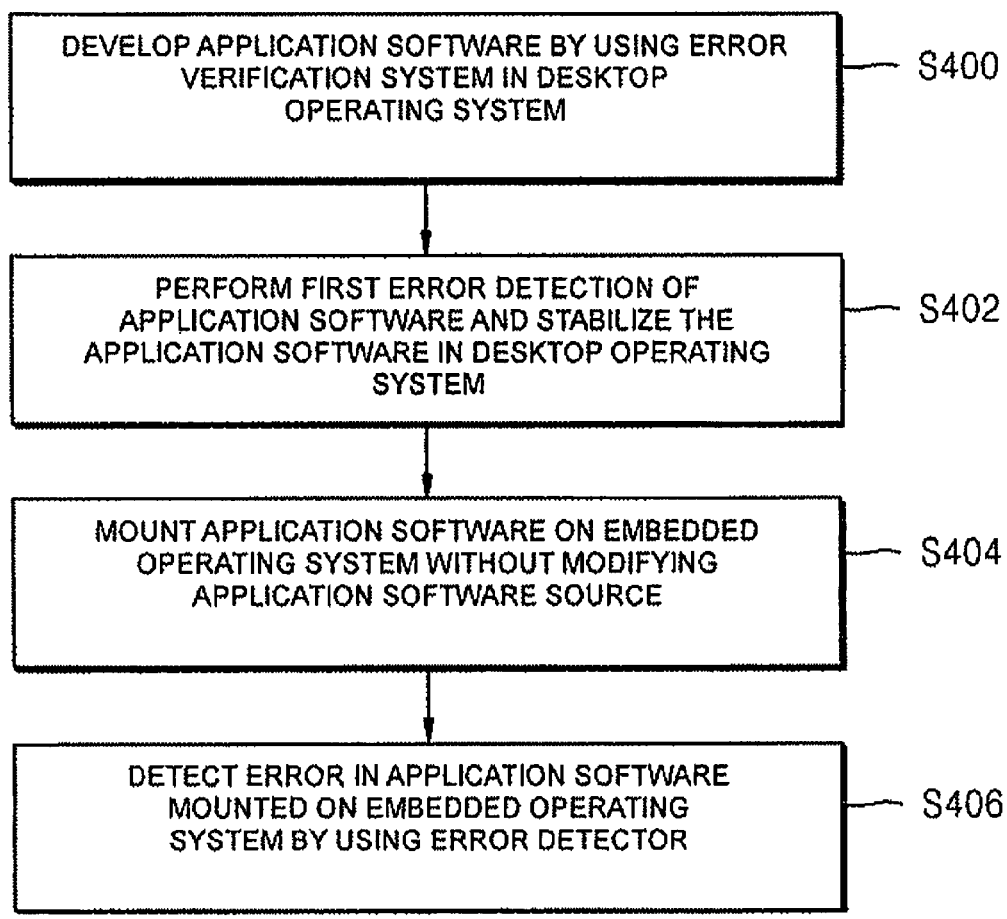
FIG. 4 is a flowchart illustrating a method of reusing an application in an error verification system, according to an embodiment.

FIG. 4 is a flowchart illustrating a method of reusing an application software in an error verification system, according to an embodiment.

Referring to FIG. 4, first, an application software is developed with a variety of development languages on a desktop OS by using the error verification system 1600 described above in operation 400. Then, in operation 402, error detection of the developed application is initially performed on the desktop OS. Here, the error detection can be performed in a variety of debugging environments, and through this process, the developed application software is stabilized. In operation 404, the program source of the stabilized application software is loaded on an embedded OS without modification. In operation 406, by using an error detector according to an embodiment, errors in the loaded application software are detected.

As illustrated in FIG. 4, the application software 1200 which is developed and stabilized by using the error verification system 1600 on the desktop OS 2310, can be loaded on the embedded OSs 1510 and 1521 and reused without modifying the sources.

According to the conventional technology, when embedded software developed on a desktop OS is loaded on an embedded system, the source code should be modified and then loaded, or in an environment such as with an OS 1521 development languages, it is difficult to debug and stabilize the application software 1200.

Figure 5:
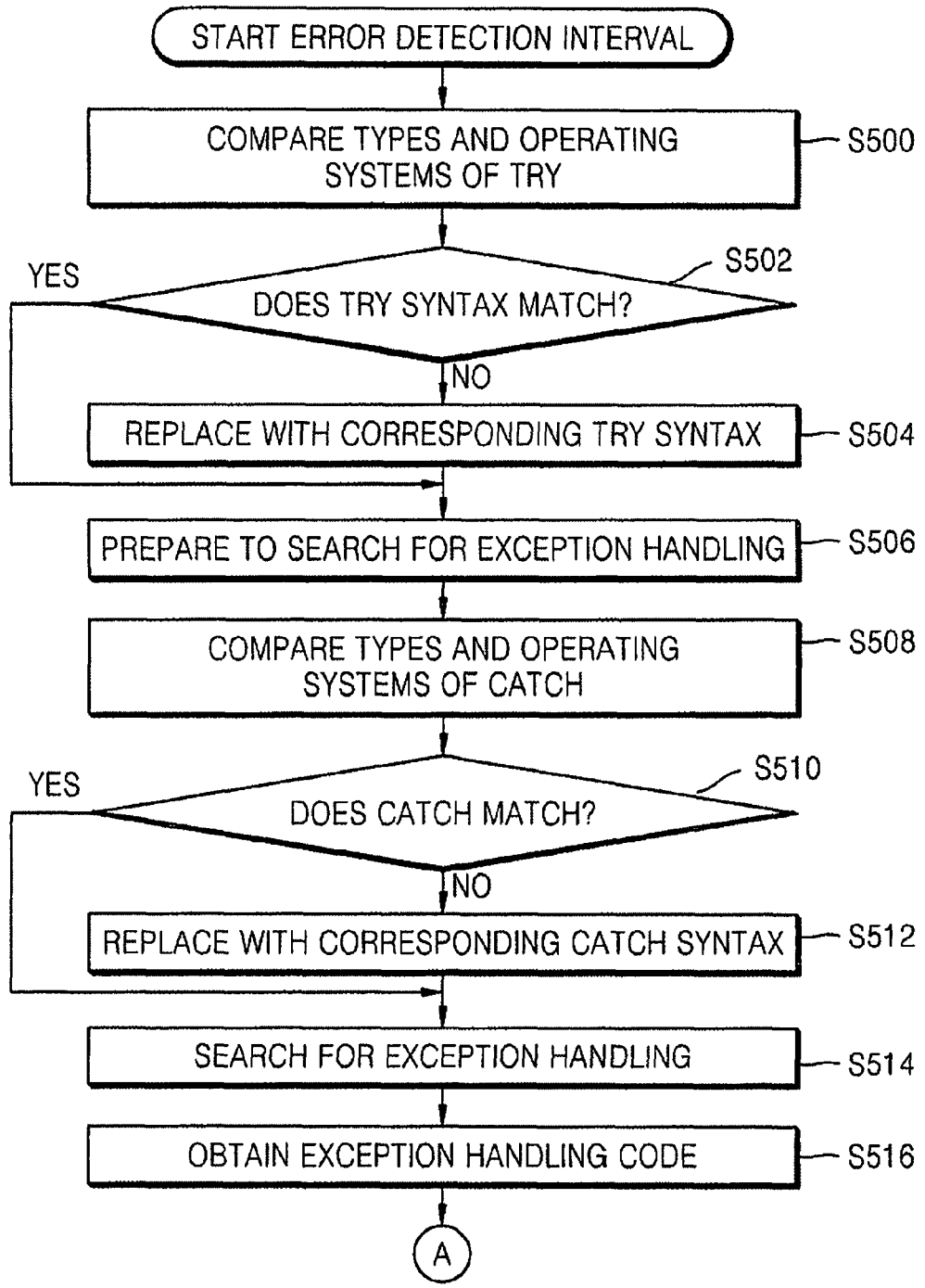
FIGS. 5 and 6 are flowcharts illustrating an error detection algorithm independently of development languages and operating systems, according to an embodiment.
Figure 6:
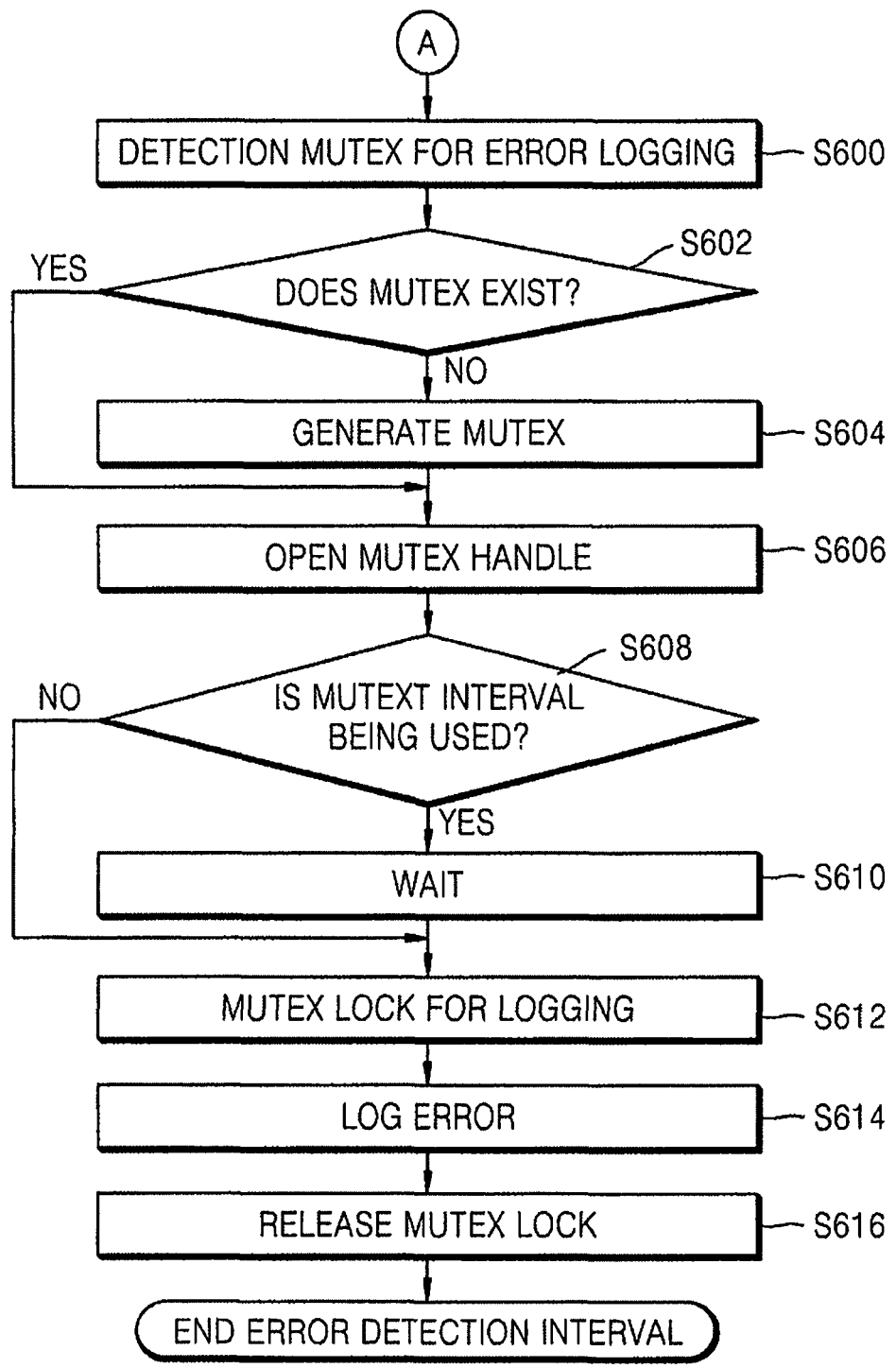

However, according to an embodiment, an application software can be developed and debugged, and initially stabilized through a long-run test, by using a variety of development tools and a convenient development environment through the error verification system 1600 on the desktop OS 2310, and then, a source code corresponding to the application software 1200 can be reused directly in the embedded OSs 1510 and 1520 without modifying the source code. This is because, if the application software 1200 uses an API supported by the embedded OSs 1510 and 1520, the source code does not need to be modified because the API wrapper 2120 with the same name can be used. Also, since an API supported by the error detector 1300 operates irrespective of OSs and development languages, the source code can also be reused without modification. For example, developers of information terminals ranging from very light to high-end products, including refrigerators, MP3 players, and mobile phones, can develop an application software 1200, such as middleware and application softwares, purely with the error verification system 1600 software without a development board. Then, with the application software in the OS 1510 which does not support error detection, and by using the error detector 1300, the developer can detect errors of and stabilize the application software initially in the desktop OS 2310. Accordingly, the time taken for detecting an error in the application software 1200 by the conventional technology having the side effects of the unification of hardware and OSs 1510 and 1521 can be reduced to a minimum. A more specific algorithm of this error detector 1300 will be explained with reference to FIGS. 5 and 6. FIGS. 5 and 6 are flowcharts illustrating an error detection algorithm independently of development languages and operating systems, according to an embodiment.

Referring to FIGS. 5 and 6, algorithms for an exception handling method supported in a variety of ways in OSs and development languages and an error detection method capable of independently handling an environment that does not support exception handling will now be explained.

As described above, through this error detection algorithm, the development source that is stabilized by an error detection method which is used when an application software is developed in the error verification system 1600 illustrated in FIG. 4, can be reused in another OS and other hardware.

First, as illustrated on the left-hand side of table 1 below, when an application is developed, ERR_DETECT_TRY is inserted into line 003, which is a start part of an interval for examining an error, and then coded, and ERR_DETECT_CATCH is inserted into [020], which is an end part of the interval for examining an error, and then coded. According to this, if a critical error occurs inside a function between lines 001 and 021, the error is detected and logged at line 020, and thus, it can be confirmed that the error occurred at a specific time.

Also, as illustrated on the right-hand side of table 1, one or more macros may be inserted. That is, ERR_DETECT_TRY is inserted into line 003, ERR_DETECT_CATCH is inserted into line 010, and then, coding is performed. ERR_DETECT_TRY is inserted into line 012 and ERR_DETECT_CATCH is inserted into line 020, and then, coding is performed. According to this, if a critical error occurs between lines 001 and 021, the error is detected and logged at lines 010 and 020, and thus, it can be confirmed that the error occurred at a specific interval and at a specific time in an Example API function. This simple interface for an application software developer makes it easy to develop an application software.

TABLE 1

| Example 1 | Example 2 |
| --- | --- |
| Use one macro in each function | Use one or more macros in each function |
| 001 void ExampleAPI( ) | 001 void ExampleAPI( ) |
| 002 { | 002 { |
| 003 ERR_DETECT_TRY | 003 ERR_DETECT_TRY |
| 004  :  : | 004  :  : |
| 020 ERR_DETECT_CATCH | 010 ERR_DETECT_CATCH |
| 002 } | 011 |
|  | 012 ERR_DETECT_TRY |
|  | 013  :  : |
|  | 020 ERR_DETECT_CATCH |
|  | 021 } |

Also, an advantage for detecting an error in an application software exists. For example, it is assumed that n application software sources exist and m functions for each application software source exist. If an application software is implemented by using more than tens of thousands of functions (m×n), it is very difficult to find an error due to mistakes by a developer irrespective of hardware and OSs. In addition, more time will be taken in order to detect errors of the application software because of defects occurring when hardware and Oss are combined.

As described above, if only two macros, ERR_DETECT_TRY and ERR_DETECT_CATCH, are essentially inserted into the start and end of an interval for detecting an error in each of all functions and then coded, only n×m×2 macros are added. However, according to the conventional method, the number of required jobs is n×m×"coding lines for handling errors"×"error logging lines"×"the number of times of changing intervals".

Also, when portability is low because of a use method and types different from those of Try and Catch syntaxes provided by a system, and the error detection function is not provided, each line should be found from all sources and should be footnoted or deleted. By replacing these two macros with syntaxes internally comparing development languages and OSs, portability can be provided without modifying a source code. An error detection algorithm of an application which is coded after ERR_DETECT_TRY and ERR_DETECT_CATCH are added is illustrated in FIGS. 5 and 6.

In the error detector 1300 according to an embodiment, the ERR_DETECT_TRY syntax compares the types and OSs of Try. Here, the types of Try are different depending on development languages, such as "_try {", "try {", "Try {", "RRM_HANDLER_TRY( . . . )", and "_try", in operation 500.

An environment without an error detection function provides its own error detection algorithm. Also, other types of Try syntaxes that are supported in other environments exist. In operation 502, it is determined whether these Try syntaxes match. If the Try syntaxes do not match, replacement of the Try syntax is performed according to the type of a Try handler supported by the development language and the OS in operation 504. That is, by comparing the types and OSs of Try syntaxes, ERR_DETECT_TRY is replaced by a Try syntax corresponding to the type and OS.

Then, in operation 506, preparation for searching for exception handling is performed. Here, the exception indicates a case where an application runs away from a normal flow and causes congestion in an abnormal path. The exception includes an error or a bug, and means that an unexpected abnormal state occurs in the middle of operating a computer system, and due to the abnormal state, a program in execution is affected. For example, exception handling is processed with syntaxes such as 'catch/finally', 'throws', and 'throw', by declaration of a programmer. When an exception occurs, 'catch' determines whether to restore the flow of a program by identifying the exception, or to finish the program. The exception may be processed directly at the place where the exception occurs, or by pointing out a place in which the exception is processed, the exception may be thrown for exception handling.

In operation 508, if a critical error occurs in an interval after the interval in which ERR_DETECT_TRY begins, ERR_DETECT_CATCH does not terminate the system, and prepares to handle an exception situation, and then compares the types and OSs of Catch. Then, in operation 510, it is determined whether or not Catch syntaxes match. If the Catch syntaxes do not match, replacement of the Catch syntax is performed according to the type of a Catch handler supported by a development language and an OS in operation 512. That is, the Catch syntax is replaced by any of "}_except(1) {", "RRM_HANDLER_CATCH( )", "} catch( . . . ) {", an environment without an error detection function providing its own Catch algorithm, and a Catch handler supported by other environments.

In operation 514, the type of a system error is searched for. That is, an API wrapper supported by the OS and development language is substituted and the source name and line in which an error occurs are recognized through exception handling.

In operation 516, an exception code that currently occurs is searched for. Here, a corresponding error is selected from exception handling codes as illustrated in table 2 below. Table 2 illustrates ERR_ACCESS_VIOLATION, ERR_DIVIDE_BY_ZERO, and ERR_STACK_OVERFLOW, which will be explained below with reference to FIGS. 7 through 9.

TABLE 2

ERR_ACCESS_VIOLATION
ERR_DATATYPE_MISALIGNMENT
ERR_BREAKPOINT
ERR_SINGLE_STEP
ERR_ARRAY_BOUNDS_EXCEEDED
ERR_FLT_DENORMAL_OPERAND
ERR_FLT_DIVIDE_BY_ZERO
ERR_FLT_INEXACT_RESULT
ERR_FLT_INVALID_OPERATION
ERR_FLT_OVERFLOW
ERR_FLT_STACK_CHECK
ERR_FLT_UNDERFLOW
ERR_DIVIDE_BY_ZERO
ERR_INT_OVERFLOW
ERR_PRIV_INSTRUCTION
ERR_IN_PAGE_ERROR
ERR_ILLEGAL_INSTRUCTION
ERR_NONCONTINUABLE_EXCEPTION
ERR_STACK_OVERFLOW
ERR_INVALID_DISPOSITION
ERR_GUARD_PAGE
ERR_INVALID_HANDLE
ERR_ACCESS_VIOLATION

This exception handling code is selected and preparation for logging an error is performed.

FIG. 6 illustrates a flowchart illustrating a method of logging an occurred error after confirming the exception handling described above with reference to FIG. 5.

First, before logging an error, in order to prevent an error during logging caused by exceptional situations occurring in many places at the same time according to multitask and multithread, the processing order is synchronized by using mutex. Here, "mutex" is an abbreviation of the term "mutual exclusion," and is used to execute "mutual exclusion." That is, mutex is used to prevent threads having critical sections from being executed at the same time but be executed mutually exclusively. Here, the critical section is a part that may cause a problem if the section is executed at the same time in a program. If a thread is executed in a critical section, other threads cannot access the critical section and have to wait until the current thread leaves the critical section.

In operation 600, it is examined whether an already generated mutex exists, because the mutex for logging an error does not need to be generated frequently. In operation 602, it is determined whether an already generated mutex exists. If the mutex does not exist, a mutex is newly generated in operation 604. In operation 606, the handle of the already generated mutex or the newly generated mutex is opened.

Then, in operation 608, it is examined whether or not a mutex interval is used by other tasks. If the mutex interval is used by other tasks, a current task waits for a while. In operation 612, in order to log an error, mutex lock is performed. In operation 614, as illustrated in table 3 below, the time when the current exception occurs, the type of the error, the name of the source, and the source line are logged.

Here, in relation to the method of logging, since the management of the capacity and files of an embedded terminal is not easy because of a huge amount of logs recorded in real-time as a history, logging may be set so that logs can be stored in units of hours, or minutes. Also, according to other methods, logging files may be selectively deleted periodically or may not be deleted during a test performing time. Also, in the case of a terminal selectively connected to a network, logging contents may be downloaded to a remote desktop system or server periodically, thereby saving a storage space of the terminal.

TABLE 3

| Time | Type of Error | Source Name | Source Line |
|---|---|---|---|
| 09/15:16:00:33 | STACK OVERFLOW | Time.c | 125 Line |
| 09/15:16:00:35 | ACCESS_VIOLATION | MMI.c | 201 Line |

Then, in operation 616, the mutex lock is released. Finally, when the system is terminated, the mutex of the error file logging that is already generated is released.

As described above, by using only two functions, ERR_DETECT_TRY and ERR_DETECT_CATCH, at the start and end of an interval for examining an error, automatic error detection and logging functions can be provided so that a source can be reused irrespective of development languages and OSs.

If the application is thus coded and compiled, a user may not be exposed to an error item such as a situation in which the system is down, and exceptional error items are logged with less affect on other systems. Accordingly, in a long-run test and maintenance after providing a product, the logs can be effectively utilized.

Figure 7:
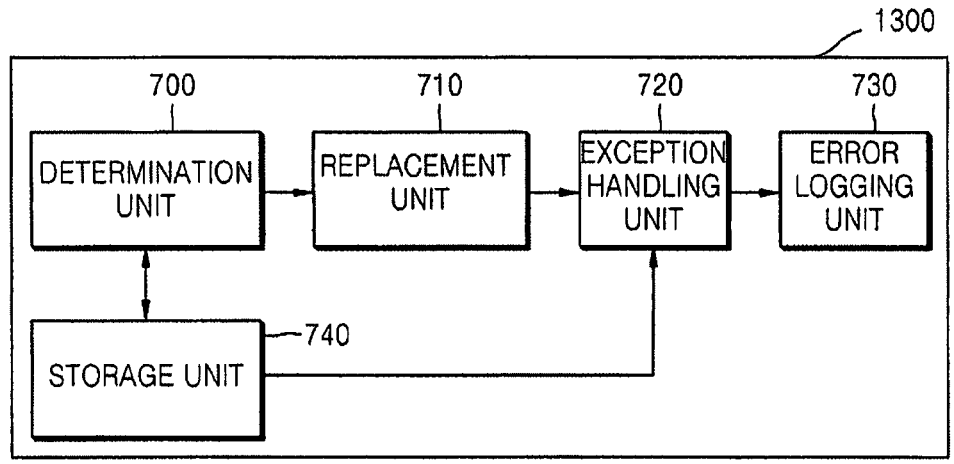
FIG. 7 is a schematic block diagram illustrating a structure of an error detection apparatus according to an embodiment.

FIG. 7 illustrates a structure of the error detection apparatus 1300 according to an embodiment.

Referring to FIG. 7, the error detection apparatus 1300 is composed of a determination unit 700, a replacement unit 710, an exception handling unit 720, an error logging unit 730, and a storage unit 740.

The determination unit 700 determines an OS of an embedded system in which a development language of an application and the application are executed.

The replacement unit 710 replaces ERR_DETECT_TRY and ERR_DETECT_CATCH included in an error detection syntax coded while an application is developed on a desktop OS, with error detection syntaxes according to the determination result of the determination unit 700, that is, a Try syntax such as "_try {", "try {", "Try {", "RRM_HANDLER_TRY( . . . )", and "_try {", which vary depending on development languages, and are supported by other environments, and a Catch syntax, such as "}_except(1) {", "RRM_HANDLER_CATCH ( )", "} catch( . . . ) {", which are supported by other environments. For an environment without an error detection function, a Catch algorithm of the error detection apparatus is provided.

The exception handling unit 720 performs exception handling of an error occurring in a function according to the result of replacing in the replacement unit 710. Then, the error logging unit 730 logs error information according to the exception handling.

Also, the storage unit 740 stores an error examination algorithm capable of examining an error, and provides its own Try and Catch algorithms in a case where error examination is not supported by a development language and an OS, that is, in an environment without an error detection function.

Figure 8:
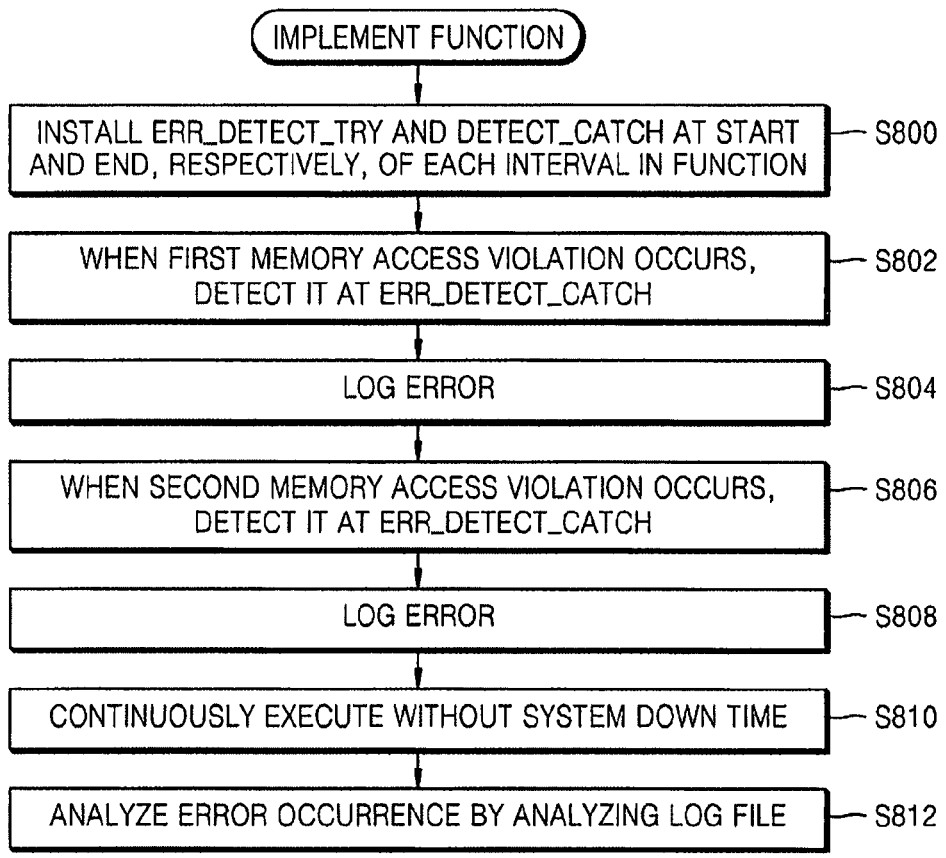
FIG. 8 is a flowchart illustrating memory access violation exception handling according to an embodiment.

FIG. 8 illustrates memory access violation exception handling according to an embodiment.

Referring to FIG. 8, in operation 800, ERR_DETECT_TRY and ERR_DETECT_CATCH are installed at the start interval and the end interval, respectively of a function. Table 4 illustrates that ERR_DETECT_TRY is coded at [43], ERR_DETECT_CATCH is coded at [48], ERR_DETECT_TRY is coded at line 50, ERR_DETECT_CATCH is coded at line 54, ERR_DETECT_TRY is coded at [56] and ERR_DETECT_CATCH is coded at line 60.

In operation 802, if a first memory violation occurs, ERR_DETECT_CATCH at line 48 detects an error. That is, as illustrated in table 4, the size of an allocated memory is "100". However, if "100000" is set at line 45, that is, if a memory violation occurs, ERR_DETECTION_CATCH at line 48 detects the error and the error is logged in operation 804. Then, in operation 806, if a second memory violation occurs, that is, if "200000" is set at line 52, ERR_DETECT_CATCH at line 54 detects the error, and the error is logged in operation 808. In operation 810, if these memory violations occur, the system continues to run without a down time. Then, a log file as illustrated in table 5 is generated, allowing a developer to analyze the time when an error occurred, the types of errors, the source names, and the source lines, from this log file.

TABLE 4

| 40 | void SimulateAccessVialationAdoptExcept< > |
|---|---|
| 41 | { |
| 42 | char *pszData = <char *> malloc<100>, szMsg[255]; |
| 43 | ERR_DETECT_TRY |
| 44 | if <NULL ! = pszData> { |
| 45 | strcpy<&pszData[100000], "Data">; |
| 46 | } |
| 47 | sprintf<szMsg, "Data = % s", pszData>; |
| 48 | ERR_DETECT_CATCH |
| 49 | |
| 50 | ERR_DETECT_TRY |
| 51 | if <NULL ! = pszData> { |
| 52 | strcpy<&pszData[200000], "Data">; |
| 53 | } |
| 54 | ERR_DETECT_CATCH |
| 55 | |
| 56 | ERR_DETECT_TRY |
| 57 | if <NULL ! = pszData> { |
| 58 | free<pszData>;     Stack Overflow (Auto Detection) |
| 59 | } |
| 60 | ERR_DETECT_CATCH |
| 61 | } |

TABLE 5

| | | |
|---|---|---|
| CRITICAL 2006/09/11 09:41:40 | [EXCEPTION LIST: SRC:D:WsampleWpt_testWSimulateException.cpp, SRC_LINE: 48] | |
| CRITICAL 2006/09/11 09:41:40 | [EXCEPTION_ACCESS_VIOLATION] | |
| CRITICAL 2006/09/11 09:41:40 | [The thread tried to read from or write to a virtual address for which it does not have the appropriate access.] | |
| CRITICAL 2006/09/11 09:41:40 | [EXCEPTION LIST: SRC:D:WsampleWpt_testWSimulateException.cpp, SRC_LINE: 54] | |
| CRITICAL 2006/09/11 09:41:40 | [EXCEPTION_ACCESS_VIOLATION] | |
| CRITICAL 2006/09/11 09:41:40 | [The thread tried to read from or write to a virtual address for which it does not have the appropriate access.] | |

More specifically, when a task goes beyond an allocated memory area and violates another memory area, the violation is automatically detected and the system can continue to run without a user experiencing down time. Basically, ERR_DETECT_TRY and ERR_DETECT_CATCH are executed at the start interval and end interval of a function. When the memory is incorrectly used at two places in the function as illustrated in table 4, only the place where the first violation occurs in the memory is indicated according to the conventional technology. However, according to the current embodiment, ERR_DETECT_TRY and ERR_DETECT_CATCH are executed in each interval in a more detailed manner, thereby making code generation easier. Also, when the first exception situation occurs, the error is detected by ERR_DETECT_CATCH at line 48, but the system does not stop and continues to run the following lines, and when the second exception situation occurs, the error is detected by ERR_DETECT_CATCH at line 54. Accordingly, when errors caused by the developer exist, the critical error situations at the two places can be identified through logging. As a result, the time when an error occurred, the types of errors, the source names, and the source lines as shown in a log file can be identified.

In operation 904, the error is logged. In operation 906, the system does not go down and continues to run normally. In operation 908, errors are analyzed by using a log file as illustrated in table 7.

TABLE 6

```
16
17      void SimulateDivideByZeroAdoptExcept< >
18  {
19      ERR_DETECT_TRY
20          int iData = 0, iDivideValue = 0;
21          char szMsg[255];
22
23          iDivideValue = 7/iData;
24          sprintf<szMsg, "Valud = % d", iDivideValue>;
25
26      ERR_DETECT_CATCH
27  }
28
```

Accordingly, all places in a specific function whre errors occur due to mistakes of a developer can be detected and a system can be prevented from going down. When N exceptions are processed, development and error detection are made to be easier. Also, in an error verification system, the size of a memory can be set so that a limited memory environment of an embedded system can be provided.

Figure 9:
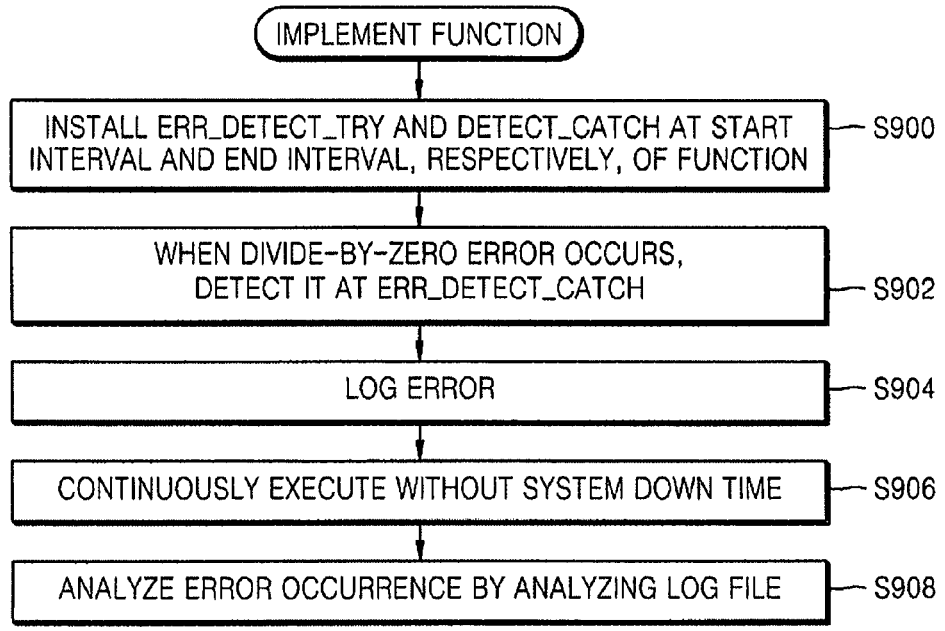
FIG. 9 is a flowchart illustrating divide by zero simulation exception handling according to an embodiment.

FIG. 9 illustrates divide by zero simulation exception handling according to an embodiment.

Referring to FIG. 9, in operation 900, ERR_DETECT_TRY and ERR_DETECT_CATCH are installed at the start interval and the end interval, respectively, of a function. As illustrated in table 6, ERR_DETECT_TRY is coded at line 19 and ERR_DETECT_CATCH is coded at line 26. Then, in operation 902, when a divide by zero error occurs at line 23, ERR_DETECT_CATCH at line 26 detects the error.

TABLE 7

CRITICAL 2006/09/11 09:41:40 [EXCEPTION LIST: SRC:D:WsampleWpt_testWSimulateException.cpp, SRC_LINE: 26]
CRITICAL 2006/09/11 09:41:40 [EXCEPTION_INT_DIVIDE_BY_ZERO]
CRITICAL 2006/09/11 09:41:40 [The thread tried to divide an interger value by an interger divisor of zero.]

More specifically, '0' is input as variable iData. Here, if the denominator is '0', the error is not detected when compiling is performed, and if exception handling is not performed, the system may be terminated. If exception handling is performed, the error is automatically detected at ERR_DETECT_CATCH and logged, and thus the time, the type, the source name, and the source line are recorded in a log file.

The divide by zero error is a slight error effective only in the current function, and does not cause an error in other areas, and thus the divide by zero error is one that does not stop the entire system. Accordingly, the error is logged, thereby allowing a developer to analyze it later after performing a long-run test. The long-run test is performed without debugging, and when a user uses the system the system is made to continue to run without a down time.

Figure 10:
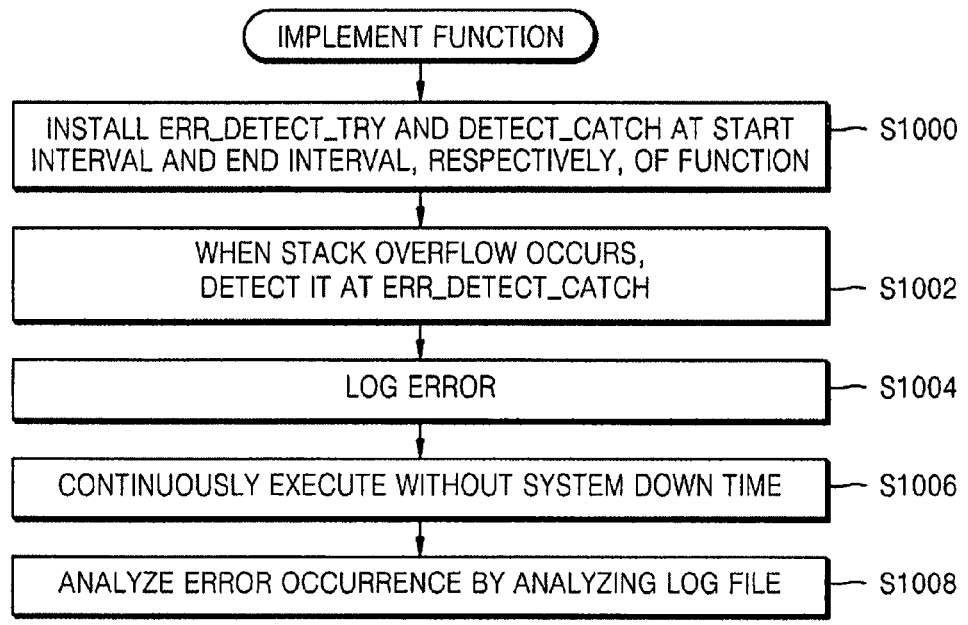
FIG. 10 is a flowchart illustrating stack overflow exception handling according to an embodiment.

FIG. 10 illustrates stack overflow exception handling according to an embodiment.

Referring to FIG. 10, in operation 1000, ERR_DETECT_TRY and ERR_DETECT_CATCH are installed at the start interval and the end interval, respectively, of a function. As illustrated in table 8, ERR_DETECT_TRY is coded at line 10 and ERR_DETECT_CATCH is coded at line 14. Then, in operation 1002, when a stack overflow occurs, ERR_DE-TECT_CATCH at line 14 detects the error. In operation 1004, the error is logged. In operation 1004, the system does not go down and continues to run normally. In operation 1008, errors are analyzed by using a log file as illustrated in table 9 below.

TABLE 8

```
7
8    void SimulateException< >
9  {
10   ERR_DETECT_TRY
11       SimulateDivideByZeroAdoptExcept< >;
12       SimulateAccessVialationAdoptExcept< >;
13       SimulateStackOverflowAdoptExcept< >;
14   ERR_DETECT_CATCH
15   }                         Stack Overflow
16                             (Auto Detection)

64   #define BUFFER_SIZE 100000000
65   void SimulateStackOverflowAdoptExcept< >
66  {
67   ERR_DETECT_TRY
68       char szData[BUFFER_SIZE], szMsg[255];
69       strcpy<&szData[BUFFER_SIZE+1], "Data">;
70       sprintf<szMsg, "Data = %s", szData>;
71   ERR_DETECT_CATCH
72   }
73
```

TABLE 9

CRITICAL 2006/09/11 09:41:40 [EXCEPTION LIST: SRC:D:WsampleWpt_testWSimulateException.cpp, SRC_LINE: 14]
CRITICAL 2006/09/11 09:41:40 [EXCEPTION_STACK_OVERFLOW]
CRITICAL 2006/09/11 09:41:40 [Stack overflow.]

More specifically, when a stack overflow occurs in a function SimulateStackOverflowAdoptExcept( ), without moving into the function, the error is automatically detected and logged at ERR_DETECT_CATCH in SimulateException( ), which is an upper function that is immediately called and is an upper-level function.

In a log file, the time, the type of the error, the source name, and the source line are recorded to indicate that the error occurred at ERR_DETECT_CATCH at [14] of the previously called function SimulateException( ), even if a stack overflow occurs in the function SimulateStackOverflowAdopt Except( ).

Also, the system can continuously run without a system down time with giving trust to the user, while the developer can collect these log files, thereby stabilizing an application software in the development stage, and in addition, providing continuous maintenance and patches. Also, even in an error verification system, a stack size with respect to each task can be set such that a limited stack environment with respect to the task of an embedded system can be provided.

According to an aspect of the embodiments, with respect to an API supported by a plurality of OSs of an embedded system, API wrappers for respective OSs are included, and the API wrappers are replaced by corresponding APIs supported by the desktop OS, and the API wrappers call the replaced APIs. In this way, software for the embedded system can be verified on the desktop OS irrespective of hardware and OSs.

Also, according to an aspect of the embodiments, the development language of an application software and the OS on which the application runs are determined, and an error detection syntax which is inserted in order to examine an error in a specific function of the application software is replaced by an error detection syntax according to the result of the determination. Then, according to the error detection syntax used as the replacement, exception handling of an error occurring in the function is performed, and the error information according to the exception handling is logged, thereby automatically detecting and logging the error irrespective of development languages and OSs.

Also, by using the error verification system and error detection apparatus irrespective of development languages and OSs according to an embodiment, an application software and an error examination code developed on a desktop OS can be reused in the embedded system without modifying the code.

One or more embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While one or more embodiments have been particularly shown and described with reference to exemplary embodiments thereof, it will be understood by those of ordinary skill in the art that various changes in form and details may be made therein without departing from the spirit and scope of the embodiments as defined by the following claims. The embodiments should be considered in descriptive sense only and not for purposes of limitation. Therefore, the scope of the invention is defined not by the detailed description of the invention but by the appended claims, and all differences within the scope will be construed as being included in the embodiments.

What is claimed is:

1. A desktop error verification system for verifying an error in an application of an embedded system, the system is implemented by a processor, the processor comprising:
application programming interface (API) wrappers corresponding to an API supported by a plurality of operating systems (OSs) of the embedded system, each of the API wrappers corresponding to one of the Oss; and
an API wrapper storage unit capable of storing a table, which allows mapping with the API supported by a desktop OS,
wherein an API wrapper is replaced by an API corresponding to the function of the API of the embedded system and supported by a desktop OS, and the API wrapper calls the replaced API, thereby verifying an error in the application, and wherein the processor verifies the error in the application for the embedded system, independent of reference to a development language of the application and an operating system on which the application is executed, wherein the API wrapper stored in the table calls the API supported by the desktop OS, thereby verifying the error in the application, and wherein the API wrapper storage unit stores information on a size of a stack and a size of a memory required in the embedded system environment.

2. The system of claim 1, further comprising a console and GUI monitoring environment providing unit for screen output and terminal control in the embedded system.

3. A method of detecting an error in an application which is developed on a desktop OS (Operating System), after loading the application and an error detection syntax developed on the desktop OS, on an embedded system without modification, the method comprising:

verifying, using a processor, an error on the desktop OS according to an error detection syntax included in a predetermined function of the application, by using an error verification system of the desktop OS including API wrappers corresponding to an API supported by a plurality of OSs of the embedded system, each of the API wrappers corresponding to one of the plurality of the Oss an API wrapper storage unit capable of storing a table, which allows mapping with the API supported by a desktop OS, wherein the API wrapper stored in the table calls the API supported by the desktop OS, thereby verifying the error in the application, and wherein the API wrapper storage unit stores information on a size of a stack and a size of a memory required in the embedded system environment loading the verified application on the embedded system;

determining a development language of the application and an OS of the embedded system on which the application is executed;

replacing the error detection syntax with an error detection syntax corresponding to the development language and the OS according to the result of the determination; and according to the result of the replacing, performing exception handling for an error occurring in the function, and logging the error information according to the exception handling, wherein the processor verifies the error in the application for the embedded system, independent of reference to a development language of the application and an operating system on which the application is executed.

* * * * *